United States Patent [19]

Brooks

[11] 4,070,775
[45] Jan. 31, 1978

[54] ROAD EMERGENCY SIGN

[76] Inventor: John Doyle Brooks, Rte. 4, Batesville, Ark. 72501

[21] Appl. No.: 739,344

[22] Filed: Nov. 5, 1976

[51] Int. Cl.² ............................................. G09F 11/06
[52] U.S. Cl. ................................. 40/492; 116/132 A; 40/592
[58] Field of Search .............. 40/67, 129 C; 116/63 P, 116/132 A

[56] References Cited

U.S. PATENT DOCUMENTS

| 274,726 | 3/1883 | Crawford | 40/67 |
|---|---|---|---|
| 1,592,241 | 7/1926 | Welday | 40/67 |
| 2,528,962 | 11/1950 | Lieutard | 40/67 X |
| 3,810,092 | 5/1974 | Tucker | 40/129 C |

Primary Examiner—Russell R. Kinsey
Assistant Examiner—Wenceslao J. Contreras
Attorney, Agent, or Firm—Clarence A. O'Brien; Harvey B. Jacobson

[57] ABSTRACT

A plurality of elongated generally rectangular panel members are provided and include first and second sets of corresponding ends. A pivot fastener is secured through and pivotally joins one set of corresponding ends of the panel members together for relative angular displacement of the panel members. The panel members are swingable from a compact position with the panel members in full registry with each other and positions with at least one of the panel members angularly displaced relative to the remaining panel members. A spacing and friction washer is disposed between each pair of adjacent panel members and about the pivot fastener whereby the panel members may be frictionally retained in relatively angularly displaced positions. Each panel member is white in color and has word defining letters formed on its opposite sides with light reflective material of a color other than white. The word defining indicia on the opposite sides of each panel member are identical, the word forming indicia on the remote panel members is identical, and the word forming indicia on each panel member intermediate the remote panel members different.

4 Claims, 4 Drawing Figures

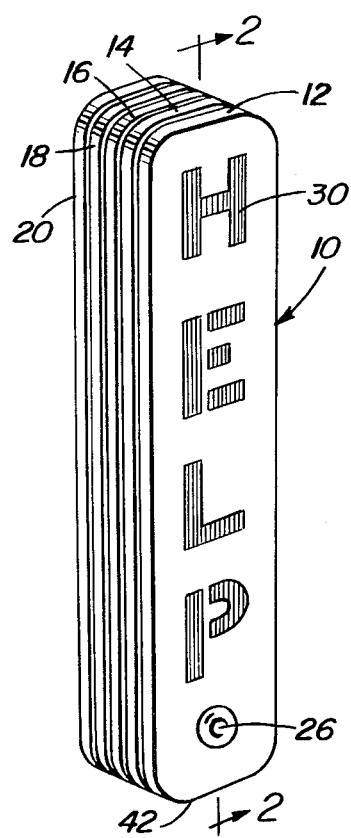
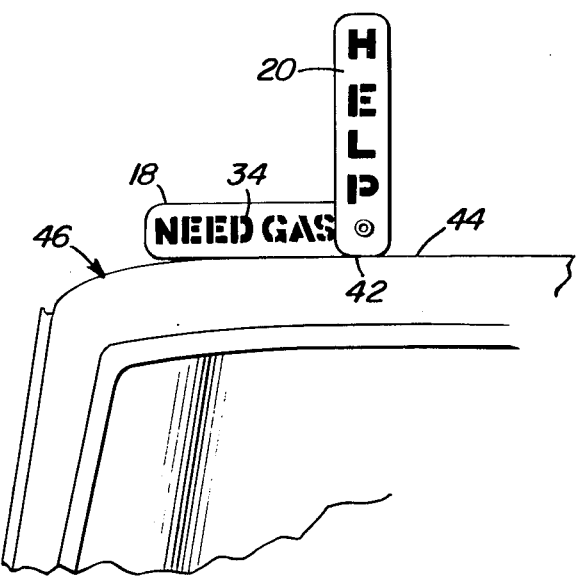
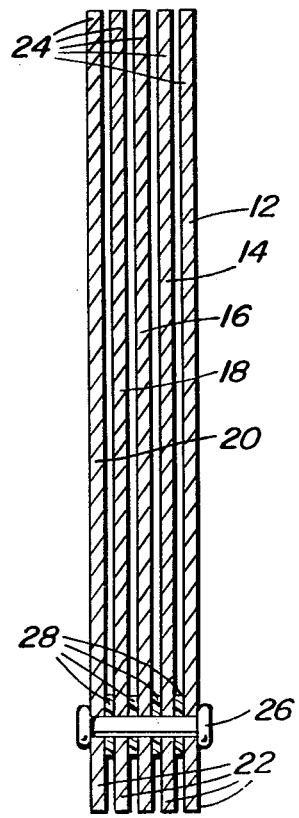
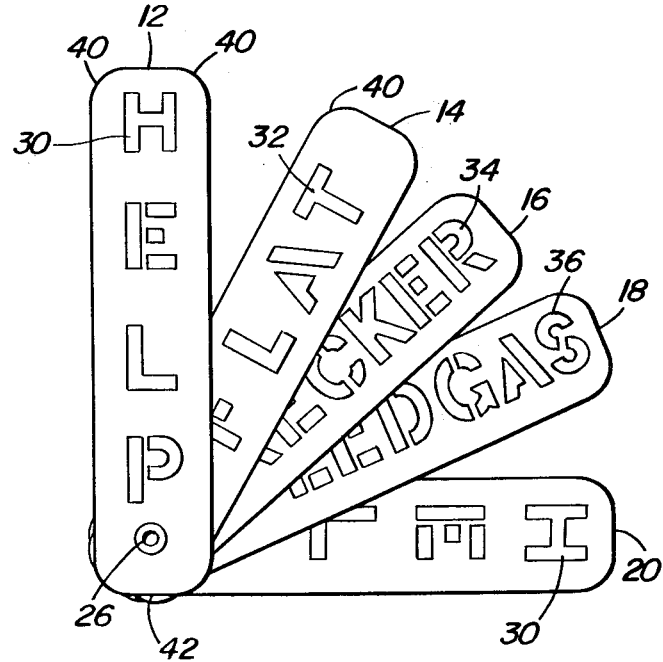

ROAD EMERGENCY SIGN

BACKGROUND OF THE INVENTION

Various forms of collapsible multi-message aid seeking signs have been heretofore provided. However, most of these previously designed signs have not been constructed specifically for use in conjunction with vehicles stopped along roadways and have not been constructed in a manner whereby the same aid seeking message may be viewed from either direction along the roadway. Accordingly, a need exists for a collapsible multi-message aid seeking sign which will be capable of indicating the type of aid requested to motorists approaching from opposite directions.

Examples of various forms of multi-message signs heretofore designed are disclosed in U.S. Pat. Nos: 1,251,670, 1,888,368, 3,139,611, 3,623,254, 3,810,092 and 3,840,285.

BRIEF DESCRIPTION OF THE INVENTION

The road emergency sign of the instant invention includes a plurality of generally rectangular panel members with one set of corresponding ends of the panel members pivotally secured together in faced plan registry. The panel members are each thus angularly displaceable relative to the remaining panel members and the opposite side faces of each panel member is provided with word forming indicia to indicate the type of roadside assistance required.

The main object of this invention is to provide a road emergency sign which may be readily stored in a compact state and yet which may be quickly erected to request various types of roadside assistance from motorists approaching in opposite directions.

Another object of this invention is to provide a road emergency sign constructed in a manner whereby its effective use may be accomplished by substantially all licensed vehicle operators.

Still another important object of this invention is to provide a road emergency sign which will be highly visible when the lights from oncoming vehicles are cast thereon at nighttime.

A final object of this invention to be specifically enumerated herein is to provide a road emergency sign in accordance with the preceding objects and which will conform to conventional forms of manufacture, be of simple construction and easy to use, so as to provide a device that will be economically feasible, long-lasting and relatively trouble-fee in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the road emergency sign of the instant invention with the various panel members thereof pivoted to relative positions with the panel members in full registry with each other;

FIG. 2 is an enlarged vertical, sectional view taken substantially upon the plane indicated by the section line 2—2 of FIG. 1;

FIG. 3 is an elevational view of the emergency sign in use supported from the top of a vehicle; and FIG. 4 is an enlarged elevational view of the sign as seen from the side thereof opposite to that illustrated in FIG. 3 and with the various panel members thereof in different relatively rotated positions.

DETAILED DESCRIPTION OF THE INVENTION

Referring now more specifically to the drawings, the numeral 10 generally designates the road emergency sign of the instant invention. The sign 10 includes a plurality of generally rectangular flat panels 12, 14, 16, 18 and 20, including first and second sets of corresponding ends 22 and 24. The panel members 12, 14, 16, 18 and 20 are illustrated in FIGS. 1 and 2 as disposed in full plan registry with each other. A pivot fastener 26 is secured through the first ends 22 pivotally joining the latter together and a plurality of friction and spacing washers 28 are disposed on the pivot fastener 26 between adjacent panels. Accordingly, the panels 12, 14, 16, 18 and 20 are disposed in parallel spaced apart planes.

With reference now more specifically to FIG. 4 of the drawings, it may be seen that the panels 12 and 20 have identical word forming indicia 30 formed thereon. The panel members are white in color and the indicia 30 are light reflective and red in color. In addition, the opposite sides of both panel members 12 and 20 are provided with the indicia 30.

The panel member 14 is also white in color and has light reflective red indicia 32 on its opposite sides, the panel member 16 is white in color and has red light reflective indicia 34 on its opposite sides, and the panel member 18 is also white in color and has red light reflective indicia 36 on its opposite sides. The indicia 32 on opposite sides of the panel member 14 are reversed in position relative to each other in order that the indicia 32 will form the word "FLAT" and the panel member 14 is horizontally disposed and viewed from either side. The indicia 34 on the panel member 16 are reversed on opposite sides thereof and form the word "WRECKER" when the panel member 16 is in the horizontal position and viewed from either side. Further, the indicia 36 on the panel member 18 are also reversed on opposite sides thereof and form the words "NEED GAS" when the panel member 18 is viewed from either side and is disposed in the horizontal position.

While the indicia 32, 34 and 36 on the panel members 14, 16 and 18 form the desired words when those panel members are in horizontal positions, the indicia 30 on the panel members 12 is arranged thereon to define the word "HELP" when the panel members 12 and 20 are in vertical positions.

As hereinbefore set forth, the panel members 12, 14, 16, 18 and 20 are generally rectangular in configuration and the four corners of each panel member are rounded as at 40. The rounded corners 40 have a radius of curvature at least somewhat less than one-half the width of the panel members. Further, the pivot fastener 26 is centrally located relative to the width of the panel members 12, 14, 16, 18 and 20 and spaced from the terminal ends of the first set of ends 22 thereof a distance equal to one-half the transverse width of the panel members.

It may be seen from FIGS. 1, 3 and 4 of the drawings that each of the panel members is provided with an end edge 42 which may be positioned in coplanar relation with either side edge of or the other panel members when the latter is disposed at generally 90° relative to the first mentioned panel member. Therefore, the end edges 42 of the panel members 12 and 20 tend to assist in maintaining either one or both of the panel members 12 and 20 in the upright position when supported upon the top 44 of a vehicle referred to in general by the reference numeral 46, see FIG. 3.

In operation, the sign 10 may have the various panel members thereof disposed in fully registered positions, such as those illustrated in FIG. 1 of the drawings. In this condition, the sign 10 may be readily stored within the glove compartment of the vehicle 46, the individual panel members being approximately 14 inches long and 3 inches in width. If it is desired to utilize the sign 10, the sign 10 is initially placed upon the top 44 of the vehicle 46 with all of the panel members in the upstanding position. Then, the panel member 14, 16 or 18, defining the type of assistance required, is swung outwardly from between the remaining panel members and to a horizontal position whereby the indicia 30 on the remote sides of the panel members 12 and 20 may be viewed from either direction as well as the indicia on the panel member 14, 16 or 18 swung out from between the remaining panel members to a horizontal position. Of course, as hereinbefore set forth, the lower end edges 42 of the panel members retained in upright positions coact with the lower marginal edge of the panel member swung to the horizontal position whereby a sturdy support is provided for the sign 10 upon the top 44 independent of any other form of supporting means. The washers 28 tend to frictionally retain the panel members in their relatively angularly adjusted positions after the sign 10 has once been erected in a manner similar to that illustrated in FIG. 3. Further, if it is not desirable to display the sign 10 on the roof or other upwardly facing surface of a vehicle, the sign may be hand held or placed upon the ground or on any available low support adjacent the roadway.

The individual panel members may be formed of plastic so as to be lightweight, inexpensive and weather resistant. Further, plastic is sufficiently soft, in most cases, to prevent the various edges of the sign 10 in contact with the top 44 from marring the finish on the top 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A road emergency sign including at least three elongated panel members of substantially the same plan shape and size and having first and second sets of corresponding ends, pivot fastener means pivotally securing said first set of ends together with said panel members spaced apart and relatively swingable in parallel planes between closed positions in registry with each other and open positions with one or more of said panel members swung about said pivot fastener means relative to each other, and assistance required indicating indicia formed on the remote sides of the remote panel members and required assistance type indicating indicia formed on the opposite sides of each intermediate panel member disposed between said remote panel members, said pivot fastener means and said panel members including means establishing a friction connection between adjacent panel members tending to frictionally retain said panel members in adjusted relatively angularly displaced positions, said indicia on said remote panel members comprising word forming indicia spaced therealong and readable from top to bottom when said remote panel members are disposed in upstanding position with their second ends uppermost, said indicia on said intermediate panel members comprising word forming indicia spaced therealong and readable from left to right when said intermediate panel members are horizontally disposed, the indicia on the opposite sides of each of said intermediate panel members being relatively reversed, end-to-end, said remote sides of said remote panel members being at least substantially fully uncovered for viewing of the indicia thereon at all times, independent of the adjusted angular positioning of said remote panel members remote to each other and the intermediate panel members, said panel members including corresponding opposite end edges and corresponding opposite side edges, the end edges of said remote panel members at said first set of corresponding ends and at least one set of said corresponding side edges of the intermediate panel members being positionable in substantially coplanar relation when said remote and intermediate panel members are angularly displaced generally 90° relative to each other, whereby when said remote panel members are disposed in upstanding position with said second ends uppermost and one of said intermediate panel members is horizontally disposed, the lower end edges of said remote panel members and the lower side edge of said one intermediate panel member may be positioned in coplanar relation for direct support of said sign from a generally horizontal support surface.

2. The combination of claim 1 wherein said panel members are white in color and said indicia are of a contrasting color.

3. The combination of claim 2 wherein said indicia are formed by a light reflective coating on said panel members.

4. The combination of claim 2 wherein said indicia are red in color.

* * * * *